United States Patent
Zhang

(10) Patent No.: US 12,519,129 B2
(45) Date of Patent: Jan. 6, 2026

(54) SOLID STATE ELECTROLYTE FOR AN ELECTRODE LAYER OF A SOLID STATE BATTERY

(71) Applicant: PowerCo SE, Salzgitter (DE)

(72) Inventor: Wenbo Zhang, Calberlah (DE)

(73) Assignee: PowerCo SE, Salzgitter (DE)

( * ) Notice: Subject to any disclaimer, the term of this patent is extended or adjusted under 35 U.S.C. 154(b) by 738 days.

(21) Appl. No.: 17/668,759

(22) Filed: Feb. 10, 2022

(65) Prior Publication Data

US 2022/0255127 A1    Aug. 11, 2022

(30) Foreign Application Priority Data

Feb. 10, 2021    (DE) .................. 10 2021 201239.6

(51) Int. Cl.
| | |
|---|---|
| H01M 10/0562 | (2010.01) |
| C01D 15/00 | (2006.01) |
| H01M 4/62 | (2006.01) |
| H01M 10/0525 | (2010.01) |

(52) U.S. Cl.
CPC ........ *H01M 10/0562* (2013.01); *C01D 15/00* (2013.01); *H01M 4/62* (2013.01); *H01M 10/0525* (2013.01); *C01P 2006/40* (2013.01); *H01M 2300/0071* (2013.01)

(58) Field of Classification Search
CPC ......... H01M 10/0525; H01M 10/0562; H01M 2300/0071; H01M 4/62; C01P 2006/40; C01D 15/00
See application file for complete search history.

(56) References Cited

U.S. PATENT DOCUMENTS

| | | | |
|---|---|---|---|
| 6,649,304 B2 | 11/2003 | Tani et al. | |
| 8,574,771 B2 | 11/2013 | Kim et al. | |
| 10,818,970 B2 | 10/2020 | Yoon et al. | |
| 11,973,183 B2 | 4/2024 | Kanno et al. | |
| 2016/0248118 A1* | 8/2016 | Chan | D01D 5/0015 |
| 2018/0233776 A1 | 8/2018 | Xie et al. | |

FOREIGN PATENT DOCUMENTS

| | | |
|---|---|---|
| CN | 1339844 A | 3/2002 |
| CN | 109980273 A | 7/2019 |
| CN | 110911733 A | 3/2020 |
| CN | 112020787 A | 12/2020 |
| CN | 112151857 A | 12/2020 |
| WO | WO 2020/0260338 A1 | 12/2020 |

OTHER PUBLICATIONS

Search Report for German Patent Application No. 10 2021 201 239.6, mailed Oct. 19, 2021.
Search Report for Chinese Application No. 202210124941.0, dated Jan. 26, 2025.
Search Report for European Patent Application No. 22151352.6, mailed Jun. 15, 2022.

* cited by examiner

*Primary Examiner* — Lingwen R Zeng
(74) *Attorney, Agent, or Firm* — PEARL COHEN ZEDEK LATZER BARATZ LLP

(57) ABSTRACT

A solid-state electrolyte (for an electrode layer of a solid-state battery has a core made of a core material and a shell layer surrounding the core and made of a shell material, wherein the core material has a crystalline structure, and the shell material has an amorphous structure, and wherein the core material and the shell material have the same chemical composition.

7 Claims, 4 Drawing Sheets

SOLID STATE ELECTROLYTE FOR AN ELECTRODE LAYER OF A SOLID STATE BATTERY

CROSS REFERENCE TO RELATED APPLICATION

This application claims priority from German Patent Application No. 10 2021 201 239.6, filed Feb. 10, 2021, the contents of which are incorporated herein by reference.

FIELD OF THE INVENTION

The invention relates to a solid-state electrolyte for an electrode layer of a solid battery. The invention further relates to an electrode layer and to a method for producing such an electrode layer, and to a solid-state battery.

BACKGROUND OF THE INVENTION

Motor vehicles that are driven or can be driven electrically or by an electric motor, such as electric or hybrid vehicles, typically comprise an electric motor by means of which one or both vehicle axles can be driven. For the supply of electrical energy, the electric motor is usually connected to a (high-voltage) battery as an electrical energy storage device inside the vehicle.

A battery, in particular an electrochemical battery, is to be understood in this case and below in particular as a so-called secondary battery (secondary battery) of the motor vehicle. In such a (secondary) vehicle battery, consumed chemical energy can be restored by means of an electrical charging process. Such vehicle batteries are designed, for example, as electrochemical accumulators, in particular as lithium-ion accumulators. In order to generate or provide a sufficiently high operating voltage, such vehicle batteries typically have at least one battery cell module in which several individual battery cells are connected in a modular manner.

The battery cells are designed, for example, as electrochemical (thin) film cells. The thin film cells have a layered structure with a cathode layer (cathode) and with an anode layer (anode), and also with a separator layer (separator) inserted between them. By way of example, a liquid electrolyte (liquid electrolyte), which creates an ionically conductive connection and/or a charge equalization between the components, saturates these components. As a rule, several film cells are arranged stacked on top of one another as a cell stack.

Film cells with a solid-state electrolyte (solid-state electrolyte, FE), also referred to below as solid-state cells, have a higher energy storage density than film cells which have liquid electrolytes and the same construction weight and/or construction volume. Batteries with solid-state cells are also referred to below as solid-state batteries (FKB) or solid batteries. In solid-state cells, the cathode and/or the cathode layer is generally designed as a so-called composite cathode made from a solid/polymer composite material, in particular a solid-state electrolyte composite material. Composite cathodes have, for example, cathode materials, binder materials, conductive additives (carbons), and solid-state electrolytes (particulate).

The solid-state electrolytes act as an ionically conductive additive in the composite cathode. To improve the electrical properties, conductive particles are frequently added to the composite cathode as an additional conductive additive. Due to their high conductivity, carbon-based conductive particles, such as conductive carbon black or conductive graphite, are an important component of lithium-ion batteries. They reduce the cathode resistance and thus the internal resistance of the battery.

In the case of solid-state batteries, the solid-state electrolyte is important for the safety and cycle stability of the solid-state cell or battery. Solid-state electrolytes in this case preferably have high ionic conductivity, and also chemical, electrochemical, and mechanical stability.

Solid-state electrolytes with high crystallinity, such as $Li_7P_3S_{11}$, have a relatively high lithium ion conductivity. Disadvantageously, however, such crystalline solid-state electrolytes also have reduced electrochemical and mechanical stability, which can often lead to undesired (chemical) side reactions and (mechanical) cracking during operation. This can lead to an increase in cell (electrical) resistance, which reduces cell cycle stability and rate stability.

In contrast to crystalline solid-state electrolytes, amorphous solid-state electrolytes, i.e., solid-state electrolytes with little or essentially no crystallinity, have higher electrochemical and mechanical stability but lower ionic conductivity. For this reason, crystalline solid-state electrolytes are generally used for solid-state batteries.

In order to reduce the chemical side reactions in the composite cathode, it is possible, for example, to design the composite cathode without conductive carbon black or carbon-based conductive additives. However, this disadvantageously limits the ability of the solid-state battery to be charged quickly, making use in electrically driven or drivable motor vehicles more difficult.

To reduce the chemical side reactions in the composite cathode, it is also possible, for example, to use solid-state electrolytes with a higher electrochemical stability. Solid-state electrolytes with a higher electrochemical stability are often oxide-based, i.e., solid oxide electrolytes. However, solid oxide electrolytes have very high moduli of elasticity (Young's modulus) greater than 150 GPa (gigapascals) and high (electrical) contact resistance or transition resistance between the solid oxide electrolyte and a lithium-metal oxide as the cathode material, which makes use in solid-state batteries more difficult.

US 2018/0233776 A1 discloses a solid-state electrode material with a crystalline solid-state electrolyte with the formula $Li_{10\pm1}AB_2X_{12}$ and with an amorphous solid-state electrolyte with the formula $yLi_2X'\text{-}(100\text{-}y)P_2X'_5$. In this case, component A is Si, Ge, Sn, B, or Al, and component B is either P or As. The components X and X' are selected from O, S or Se, where the factor y is an integer between 65 and 85. In this case, the crystalline solid-state electrolyte is coated with the amorphous solid-state electrolyte, as a result of which side reactions and cracking in the solid electrode material are reduced.

SUMMARY OF THE INVENTION

The invention is based on the object of specifying a particularly suitable solid-state electrolyte. In particular, this should be a solid-state electrolyte that is as inexpensive and simple as possible to produce. The invention is also based on the object of specifying a particularly suitable electrode layer and a particularly suitable method for producing such an electrode layer, and a particularly suitable solid-state battery.

According to the invention, the problem is solved in respect of the solid-state electrolytes described herein, and in respect of the electrode layer described herein, and addition in respect of the method described herein and in respect of the solid-state battery described herein. Advantageous embodiments and developments are the subject matter of the claims.

The solid-state electrolyte according to the invention is intended for an electrode layer, in particular for a composite cathode, of a solid-state battery, and is suitable and configured for this purpose. The solid-state electrolyte has a core (solid-state electrolyte core) made of a core material, and a shell layer surrounding the core (solid-state electrolyte shell) made of a shell material. In other words, the solid-state electrolyte has a core/shell system. The core material has a crystalline (solid-state) structure. This means that the core material has a crystal lattice. The shell material has an amorphous (solid-state) structure, i.e., an irregular structure without macroscopic order. According to the invention, the core material and the shell material have the same chemical composition. In other words, the core material (core) and the shell material (shell) have the same stoichiometry, but differ in terms of crystallinity. As a result, a particularly suitable solid-state electrolyte is realized.

According to the invention, the solid-state electrolyte thus has a two-layer material, and the layers (core/shell) have the same stoichiometry but different properties. A second material of different stoichiometry is therefore not required; this reduces process costs and material costs. The amorphous-shell solid-state electrolyte according to the invention has the combined advantages of a crystalline solid-state electrolyte (high ionic conductivity) and an amorphous solid-state electrolyte (high electrochemical and mechanical stability). Since the structures of the materials differ only in terms of crystallinity, the core and the shell layer have improved contact with one another, which ensures a particularly low contact or transition resistance between the materials.

The core material and the shell material are made of the same solid-state electrolyte material. In this case, the shell of the core material is preferably modified by amorphization to form the shell layer. In other words, the core material is machined or treated on its shell in such a way that the core material on the shell amorphizes into the shell material. The shell material is thus an amorphized or modified core material. To produce the solid-state electrolyte, the crystal structure on the shell of the core material is converted into an amorphous structure.

According to the invention, the shell layer is therefore not a coating. The shell layer is formed as an amorphous layer on the shell of the crystalline core in such a manner that the shell layer is transformed directly from the crystalline core material. As a result, a particularly simple and cost-reduced production of the solid-state electrolyte is realized with no coating process. Furthermore, a particularly cost-effective solid-state electrolyte is realized, since no additional materials are required, and since the core is simply amorphized on the shell thereof.

Various methods can be used to modify the shell of the core amorphously—for example, mechanical processes such as ball mills, physical processes such as an ultrasonic process, and chemical or electrochemical processes. The ionic conductivity of the core solid-state electrolyte is preferably not affected by the treatment or processing of the shell.

The solid-state electrolyte is preferably in powder form. In other words, it is a solid-state electrolyte powder with an amorphous shell. This means that there is a large number of shell-modified cores. This increases the surface area, i.e., the relative proportion of the shell layer to the core, which ensures particularly high electrochemical and mechanical stability.

In a suitable embodiment, the core material and the shell material have an electrical conductivity greater than $10^{-13}$ S/cm (Siemens per centimeter). This improves the application as an ionically conductive additive in a composite cathode.

In an expedient design, the shell layer has a layer thickness of between 100 nm (nanometers) and 1000 nm. This ensures high electrochemical and mechanical stability. In this case, the cores have in particular a diameter in the micrometer range, for example between 1 μm (micrometer) and 10 μm. This means that the diameter of the cores is in particular an order of magnitude or a factor of ten (10) greater than the layer thickness.

In an advantageous development, the shell layer has a fracture toughness (cracking resistance) greater than 1 MPam$^{1/2}$ (megapascal square root meter). This gives the shell layer a particularly high resistance to crack initiation, thereby reliably preventing the formation of cracks.

In a possible embodiment, the core material and the shell material are made of a sulfide electrolyte or an oxide electrolyte. Suitable solid-state electrolyte materials are, for example, $Li_7P_3S_{11}$, $\beta$-$Li_3PS_4$, $Li_{10}GeP_2S_{12}$, $Li_3InCl_6$, $Li_3InBr_6$, $Li_7La_3Zr_2O_{12}$, $Li_{0.33}La_{0.57}TiO_3$, etc. After the shell treatment, an amorphous layer can be formed on the shell of the core, which has, for example, a stoichiometry of $70Li_2S \cdot 30P_2S_5$ or $75Li_2S \cdot 25P_2S_5$, LiCl or $LiZrO_2$.

The electrode layer according to the invention is intended for a solid-state battery and is suitable and configured therefor. The electrode layer is preferably designed as a composite cathode, i.e., as a cathode layer made of a composite material. In this case, the electrode layer or the composite material has an electrode material or cathode material, and a solid-state electrolyte as described above. The modified solid-state electrolyte acts as an ionically conductive additive in the electrode layer or composite cathode. Furthermore, in addition to the solid-state electrolyte, a conductive additive, in particular carbon-based conductive particles, can be added to the composite material. The advantages and configurations listed with regard to the solid-state electrolyte can also be transferred to the electrode layer, and vice versa. By modifying the shell of the crystalline core, side reactions and cracking during operation of the electrode layer are prevented, which improves cycle stability. This results in a particularly suitable electrode layer for a solid-state battery.

The shell of the core of the solid-state electrolyte is preferably modified or amorphized before it is introduced into the composite material. Alternatively, according to the manufacturing method for the electrode layer according to the present invention, it is also possible that an electrode material and a powdered core material are mixed, with the shell of the core material being amorphized in-situ into the shell layer. This means that the solid-state electrolyte according to the invention is produced in situ in the course of the production of the electrode layer. The statements relating to the apparatus also apply analogously to the method, and vice versa.

This means that, for example, a composite cathode made of solid-state electrolytes (crystalline and unmodified), electrode material, and conductive additive (such as conductive carbon black), is prepared by either a dry or wet process, with a dry process allowing mechanical pressure to be applied to the composite material. Subsequently, the shell of the crystalline core is amorphized in-situ. A chemical method or an electrochemical process is preferably used to amorphize the core.

The solid-state battery according to the invention has an electrode layer as described above, preferably in the form of a composite cathode. The advantages and designs mentioned in respect of the solid-state electrolyte and/or the electrode layer and/or the method can also be transferred analogously to the device and/or the solid-state battery, and vice versa. This means that the solid-state battery has a shell-amorphous solid-state electrolyte. Due to the modification of the shell of the crystalline-core solid-state electrolyte, side reactions and cracking during cycling are prevented, thereby improving the performance of the solid-state battery.

BRIEF DESCRIPTION OF THE DRAWINGS

Embodiments of the invention are explained in more detail below with reference to the drawings, wherein, in schematic and simplified representations.

Corresponding parts and dimensions are always provided with the same reference signs in all figures.

DETAILED DESCRIPTION OF THE INVENTION

Figure 1:
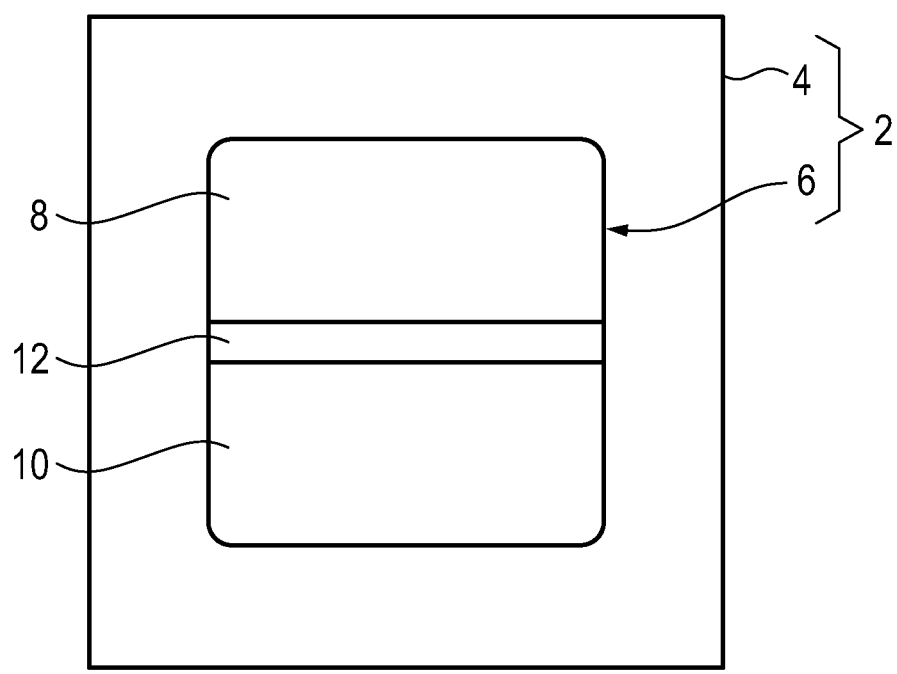
FIG. 1 shows a solid-state battery with a composite cathode as the electrode layer.

The solid-state battery 2 shown in a schematic and highly simplified manner in FIG. 1 has a battery housing 4 with at least one solid-state cell 6 accommodated therein. The solid-state cell 6 has a layer system with two electrode layers 8, 10 and a separator layer 12 arranged therebetween.

The electrode layer 8 forms the anode of the solid-state cell 6, and is also referred to as the anode layer 8 below. The anode layer 8 is made in particular from lithium. The separator layer 12 is formed from a powdered solid-state electrolyte. The electrode layer 10, also referred to below as a composite cathode, is made from a composite material to which solid-state electrolytes 14 are added as an ionically conductive additive. The solid-state electrolyte 14 of the composite cathode 10 and the solid-state electrolyte of the separator layer 12 can be made of the same material.

Figure 2:
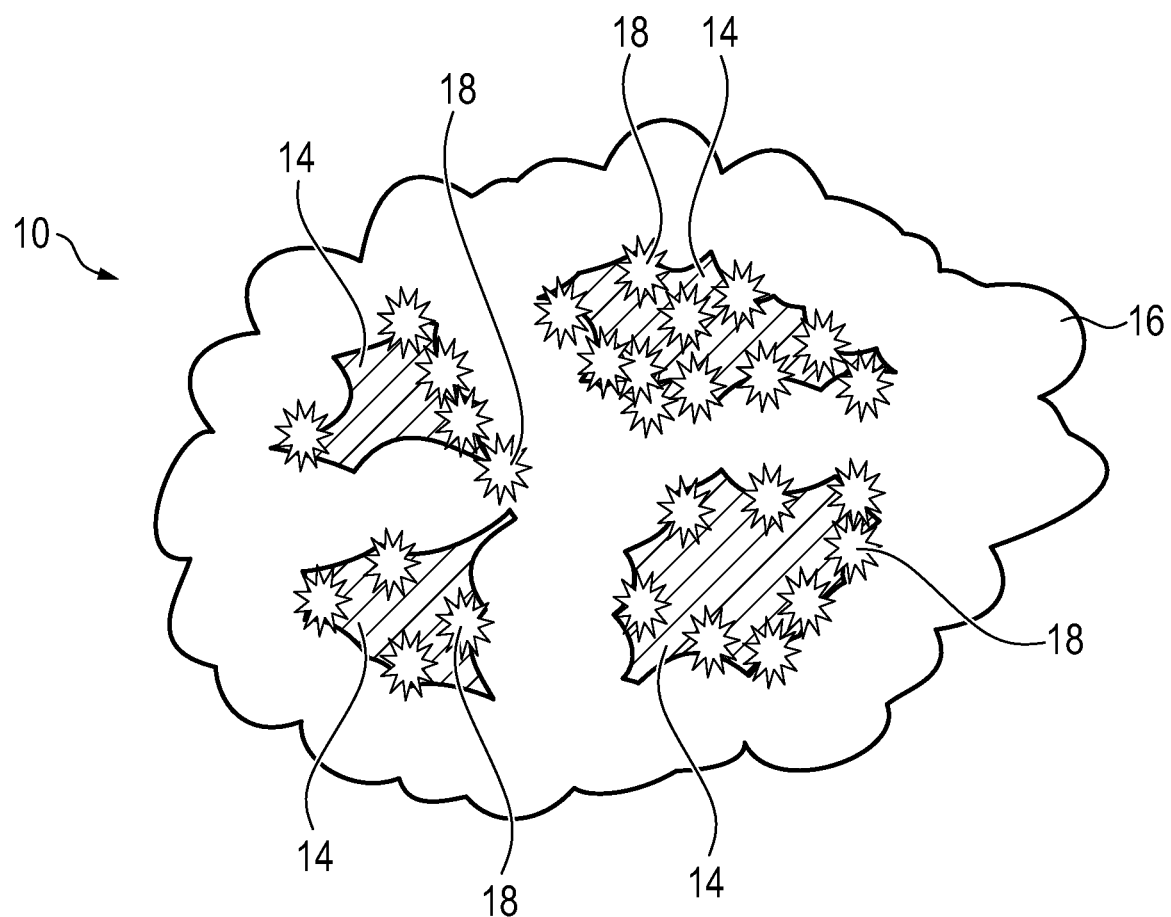
FIG. 2 is a detail of a composite cathode according to the prior art.

FIG. 2 schematically shows the structure of a composite cathode 10 according to the prior art. The composite material of the composite cathode 10 has an electrode material or cathode material 16, and has a solid-state electrolyte 14 in powder form which is mixed therewith. The solid-state electrolyte 14 or its material is highly crystalline. However, such a crystalline solid-state electrolyte 14 has reduced electrochemical and mechanical stability, which can often lead to undesired (chemical) side reactions 18 and (mechanical) crack formation during operation. The side reactions 18 shown schematically are provided with reference numbers in FIG. 2 merely by way of example.

Figure 3:
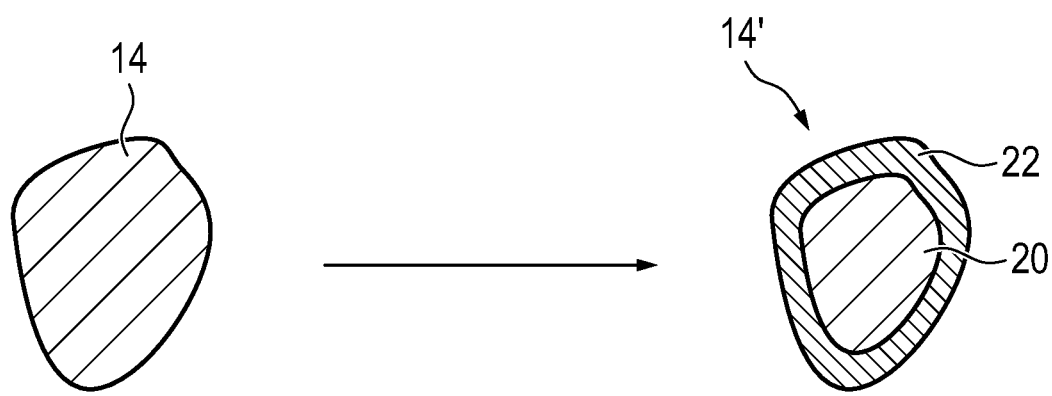
FIG. 3 is a solid-state electrolyte according to the invention.
Figure 4:
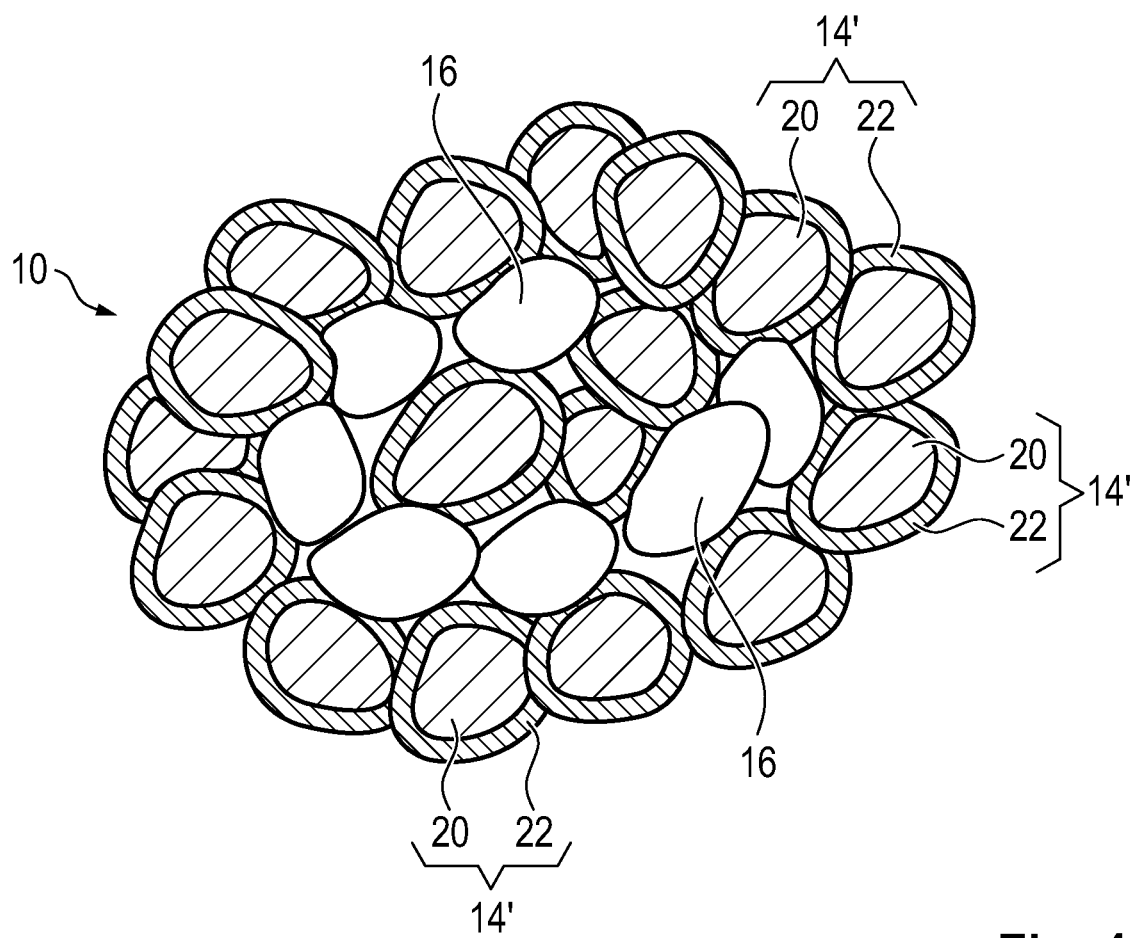
FIG. 4 is a detail of a composite cathode having solid-state electrolytes according to the invention.

To prevent or reduce the side reactions 18, the shell of the crystalline solid-state electrolyte 14 is modified or amorphized according to the invention. As a result, the solid-state electrolyte 14' according to the invention has a crystalline core 20 and an amorphous shell layer 22 surrounding it (FIG. 3). The crystalline core 20 essentially corresponds to the solid-state electrolyte 14, with the shell layer 22 having the same chemical composition or stoichiometry, but an amorphous structure with reduced crystallinity. The solid-state electrolyte 14' with amorphous shell thus has the combined advantages of a crystalline solid-state electrolyte (high ionic conductivity) and an amorphous solid-state electrolyte (high electrochemical and mechanical stability), such that the side reactions 16 are suppressed (FIG. 4). The solid-state electrolyte 14' with amorphous shell has an electrical conductivity greater than $10^{-13}$ S/cm. The shell layer 22 also has a fracture toughness or cracking resistance greater than 1 MPam$^{1/2}$.

The shell of the core material is modified by amorphization into the shell layer 22; the crystal structure at the surface is converted into an amorphous structure. This amorphization is implemented, for example, by means of a mechanical process such as ball mills, a physical process such as an ultrasonic process, or a chemical or electrochemical process. A shell layer 22 with a layer thickness of between 100 nm and 1000 nm is expediently produced in this process.

The solid-state electrolyte 14' is made of a sulfide electrolyte or an oxide electrolyte, for example. Suitable solid-state electrolyte materials are, for example, $Li_7P_3S_{11}$, $\beta$-$Li_3PS_4$, $Li_{10}GeP_2S_{12}$, $Li_3InCl_6$, $Li_3InBr_6$, $Li_7La_3Zr_2O_{12}$, $Li_{0.33}La_{0.57}TiO_3$.

Figure 5:
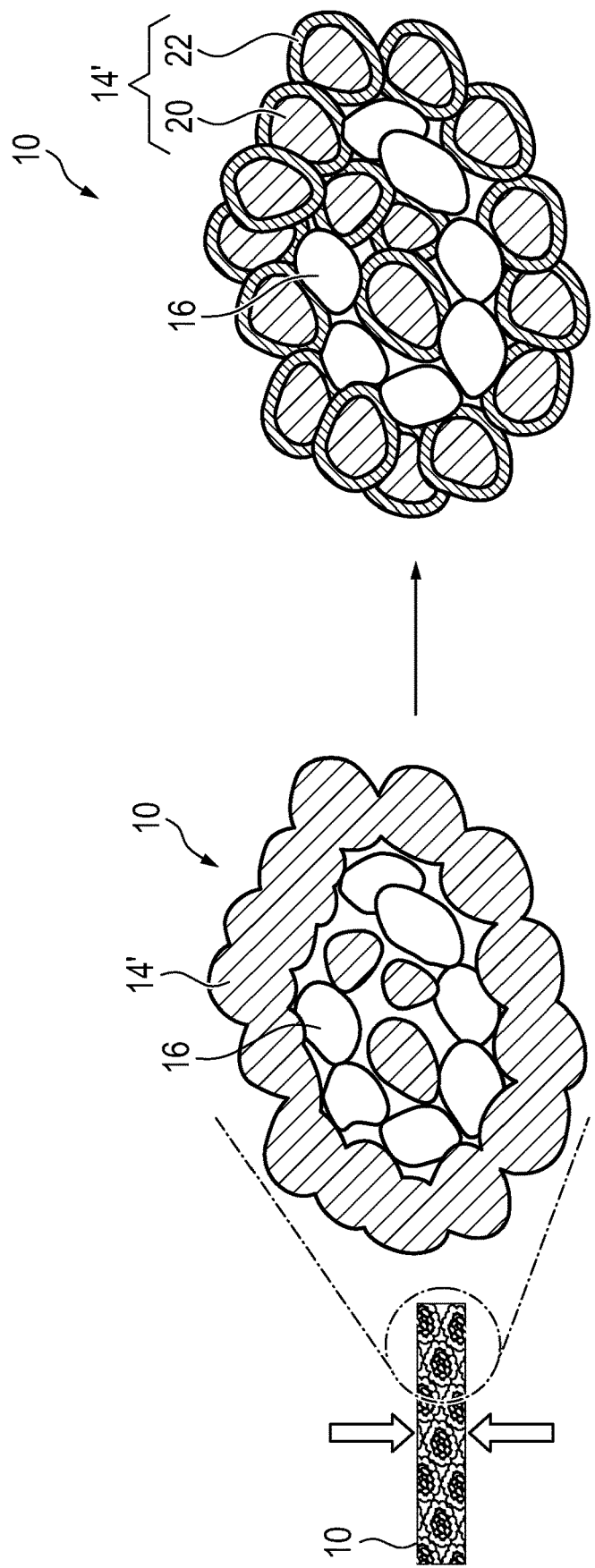
FIG. 5 is a method for producing a composite cathode having solid-state electrolytes according to the invention.

The solid-state electrolyte 14' in powder form is preferably produced before the production of the composite cathode. As a result, the treatment of the solid-state electrolyte 14' to implement the shell amorphization does not adversely affect the cathode material 16. Alternatively, it is possible, for example, to amorphize the shell of the solid-state electrolyte 14' in situ during the manufacture of the composite cathode. A corresponding method according to the invention is shown in FIG. 5.

According to the method, the composite cathode 10 is first produced from crystalline and unmodified solid-state electrolytes and from the cathode material 16, and optionally from other conductive additives, in a dry process. In the course of the dry process, a mechanical pressure, represented by arrows, is exerted on the composite material of the composite cathode 10. Subsequently, the shell of the crystalline solid-state electrolyte 14' is amorphized in-situ by means of a chemical or electrochemical process.

The invention is not restricted to the embodiments described above. Rather, other variants of the invention can also be derived therefrom by a person skilled in the art within the scope of the disclosed claims without departing from the subject matter of the claimed invention. In particular, all of the individual features described in connection with the various embodiments can also be combined in other ways within the scope of the disclosed claims without departing from the subject matter of the claimed invention.

LIST OF REFERENCE SIGNS 2 solid-state battery
4 battery housing
6 solid-state cell
8 electrode layer, anode layer
10 electrode layer, cathode layer
12 separator layer
14, 14' solid-state electrolyte
16 electrode material/cathode material
18 side reaction
20 core
22 shell layer

The invention claimed is:

1. A solid-state electrolyte for an electrode layer of a solid-state battery, comprising:
   a core made of a core material, and
   a shell layer surrounding the core and made of a shell material,
   wherein the core material and the shell material have the same chemical composition, and
   wherein the core material has a crystalline structure, and a surface of the core material is modified by amorphization to form the shell layer, such that the shell material has an amorphous structure.

2. The solid-state electrolyte according to claim 1, wherein the core material and the shell material have an electrical conductivity greater than $10^{-13}$ S/cm.

3. The solid-state electrolyte according to claim 1, wherein the shell layer has a layer thickness between 100 nm and 1000 nm.

4. The solid-state electrolyte according to claim 1, wherein the shell layer has a fracture toughness greater than 1 $MPam^{1/2}$.

5. The solid-state electrolyte according to claim 1, wherein the core material and the shell material are made of a sulfide electrolyte or an oxide electrolyte.

6. An electrode layer of a solid-state battery, having an electrode material and a solid-state electrolyte according to claim 1.

7. A solid-state battery, having an electrode layer according to claim 6.

* * * * *